United States Patent [19]

Baertlien

[11] Patent Number: 4,884,341
[45] Date of Patent: Dec. 5, 1989

[54] VENT CUTTER

[76] Inventor: Lee A. Baertlien, 1571 Granville Rd., Cedarburg, Wis. 53012

[21] Appl. No.: 121,601

[22] Filed: Nov. 17, 1987

[51] Int. Cl.$^4$ .............................................. B25F 3/00
[52] U.S. Cl. .................................... 30/123.3; 30/277.4
[58] Field of Search ...................... 30/123.3, 272, 273; 173/73, 74, 75

[56] References Cited

U.S. PATENT DOCUMENTS

| | | | |
|---|---|---|---|
| 1,221,469 | 4/1917 | Meyer | 173/74 |
| 3,832,772 | 9/1974 | Sumida | 30/123.3 |
| 4,209,069 | 6/1980 | Smith | 173/75 |

Primary Examiner—Frank T. Yost
Assistant Examiner—Willmon Fridie, Jr.
Attorney, Agent, or Firm—Foley & Lardner

[57] ABSTRACT

A vent cutter for separating the end of the rectal passage from an animal carcass, the vent cutter including a housing having an air motor mounted therein, a rotary cylindrical cutter blade driven by the air motor and having a hollow tubular pilot pin axially aligned in the cutter blade, a water passage in the housing for directing water through the cutter blade, an air passage in the housing for drawing air through the cutter blade to discharge water and waste material from the cutter blade, each passage including an air pressure operated valve connected to respond to the increase in air pressure to the air motor to open the water and air passages when the motor is operating and a trigger operated air control valve for controlling the operation of the air motor.

10 Claims, 2 Drawing Sheets

VENT CUTTER

BACKGROUND OF THE INVENTION

The present invention is related to vent cutters which are used to separate the end of the rectal passage from the carcass of animals in the preparation of meat and poultry for the consumer market. This type of equipment must be designed for ease in handling as well as ease in cleaning to meet rigid health standard. Air operated cutters of the type which are presently available generally require a separate cleaning after each use. This requires two separate hand operations in order to perform the cutting and cleaning functions.

SUMMARY OF THE INVENTION

The vent cutter, according to the present invention, includes a rotary cutter assembly that is vented to provide for automatic cleaning of the cutter assembly during the cutting operation. The vent cutter includes both water and vacuum passage which are connected to the cutter assembly and are automatically opened whenever the operator activates the rotary cutter assembly to perform a cutting function.

A principal feature of the invention is the provision of water flow through and vacuum discharge from the cutter assembly prior to or simultaneously with the operation of the cutter assembly to automatically remove waste material from the cutter assembly during each operation.

Another feature of the invention is the inclusion of impact blades internal to the cutter assembly to break up waste material as the material moves through the cutter assembly for easy discharge through the suction passage.

A further feature of the invention is the automatic operation of the cleaning system during the cutting operation which reduces time in the operation of the cutter as well as simplifies the cleaning operation.

Other principal features and advantages of the invention will become apparent to those skilled in the art upon review of the following detailed description, claims and drawings.

Figure 2:
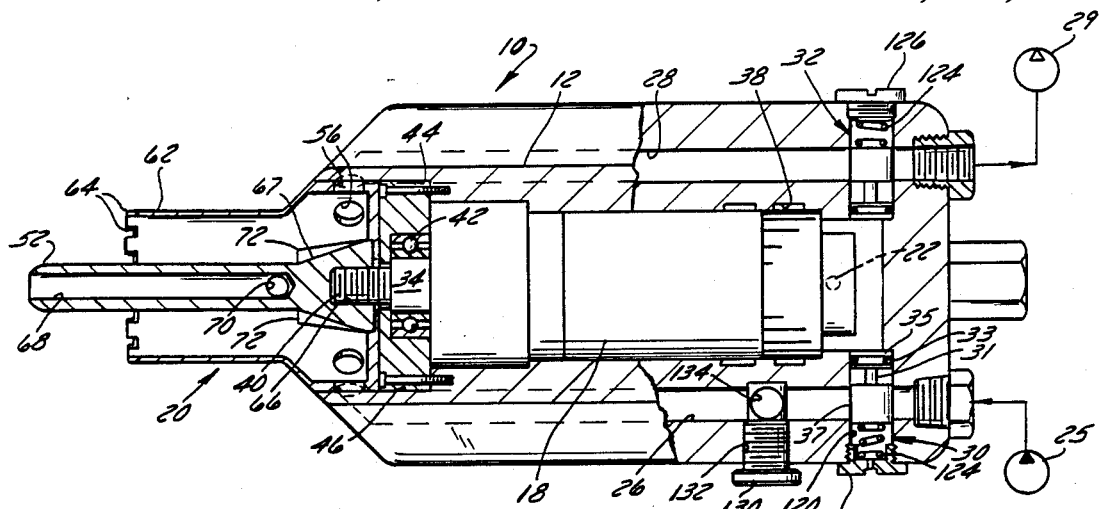
FIG. 2 is a top view partly in section showing the vent cutter in the inoperative mode.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood, that the phraseology and terminology used herein is for the purpose of description and should not be regarded as limiting.

DETAILED DESCRIPTION OF THE INVENTION

Figure 1:
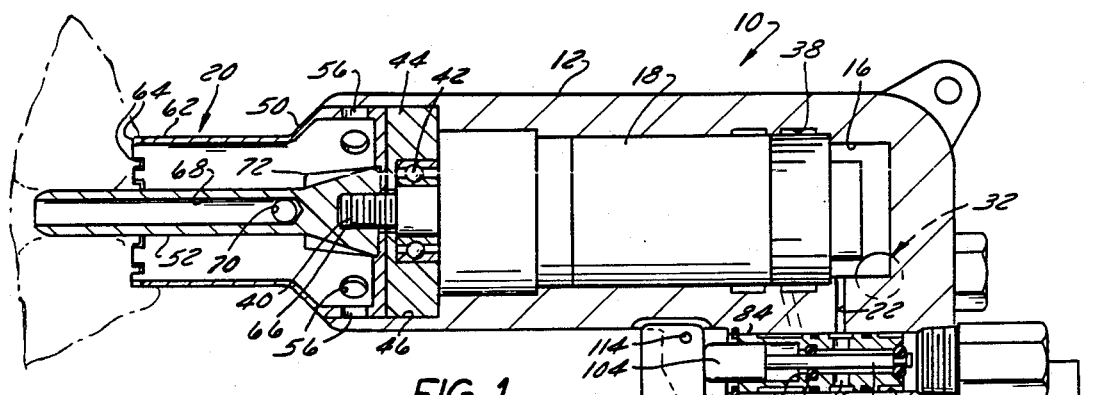
FIG. 1 is a side elevation view partly in section of the vent cutter according to the invention.

The air operated vent cutter 10 as shown in FIGS. 1 and 2 includes a housing 12 having a central bore 16 and a handle 14. An air motor 18 is positioned in the bore 16 and is operatively connected to a rotary cutter assembly 20. The handle 14 includes an open ended passage 80 connected to the bore 16 by a passage 22 and an air discharge chamber 82 connected to the bore 16 by a passage 36. A trigger operated air control assembly 24 is positioned in the open ended passage 80 in the handle 14 to control the flow of air under pressure from a source 27 to the passage 22.

The cutter assembly 20 is cleaned by directing water from a source 25 under pressure through a passage 26 into the rotating cutter assembly 20. The water and waste material is discharged from the cutter assembly 20 by means of a suction drawn through a suction passage 28 by means of a vacuum pump 29. The passages 26 and 28 are controlled by means of valve assemblies 30 and 32, respectively. The valve assemblies 30 and 32 are opened on actuation of the trigger assembly 24 to admit air under pressure into bore 16 and as the pressure in the bore 16 increases, the valve 30 and 32 will open the corresponding passages to admit water into the cutter assembly 20 and to draw water and waste material out of the assembly 20. The air motor 18 will start to rotate either simultaneously with or immediately after opening of valve assemblies 30 and 32.

The air motor 18 is a conventional type motor which includes a rotor 34 that is driven by air admitted through passage 22 and discharged through passage 36. The passage 36 being connected to an annular recess 38 provided in the bore 16 around the air motor housing. The rotor 34 includes a threaded shaft 40 which is connected to the cutter blade assembly 20 and is supported in a rotor bearing 42 mounted in a spacer 44 located in counterbore 46 located at the end of the bore 16.

The cutter assembly 20 includes a housing 50 which is secured to the motor shaft 40 by means of a pilot pin 52. The housing 50 includes a cylindrical wall 54 having a plurality of openings or ports 56 and a tapered or cone shaped end section 58 which forms an opening 60 around the pilot pin 52. A cylindrical cutter blade 62 is secured to the cone shaped section 58 of the housing 50 and includes a serrated cutting edge 64 at the outer end. It should be noted that the openings 56 lie in a plane that passes through the ends of passages 26 and 28. Water entering the housing 50 will pass through the housing flushing any waste material toward the discharge passage 28.

The pilot pin 52 includes a conical section 67 at one end having a threaded bore 66 and a passage 68 at the other end which terminates in a discharge port 70 located in housing 50. A number of axially extending impact blades 72 are provided around the outside of the conical section 67 to break up waste material for discharge through the suction passage 28. The pilot pin 52 is mounted on the motor shaft 40 by turning the threaded bore 66 onto threaded shaft 40 counter to the direction of rotation of shaft 40.

The trigger control assembly 24 is positioned in the passage 80 in the handle 14 to control the flow of air from source 27 to passage 22 to drive the air motor 18. Exhaust air flows through annular recess 38 and passage 36 into the chamber 82 provided in the handle 14 and is discharged through an opening 81 at the bottom of the handle 14. Means in the form of a porous metal plate 83 can be provided in the opening 81 to muffle the discharge air noise.

Figure 4:
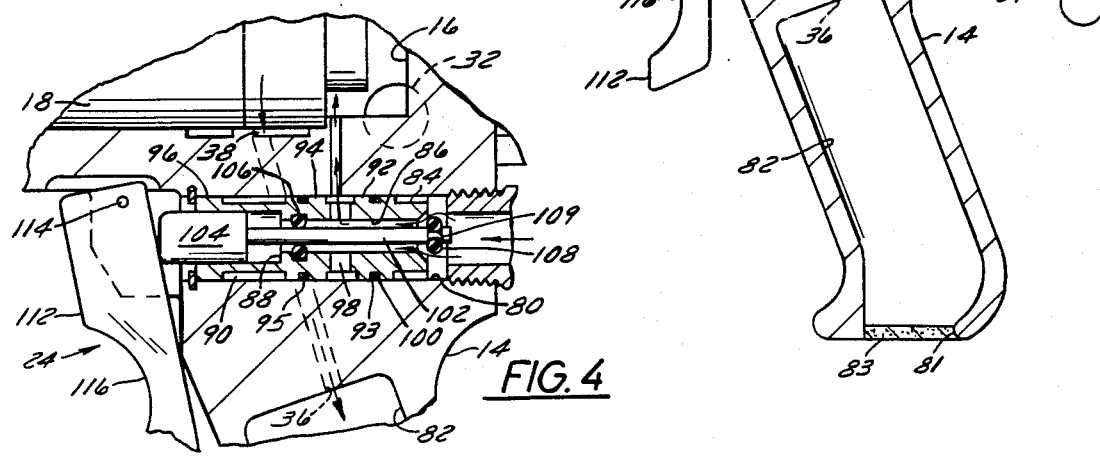
FIG. 4 is an enlarged view of a portion of the trigger operated air valve.
Figure 3:
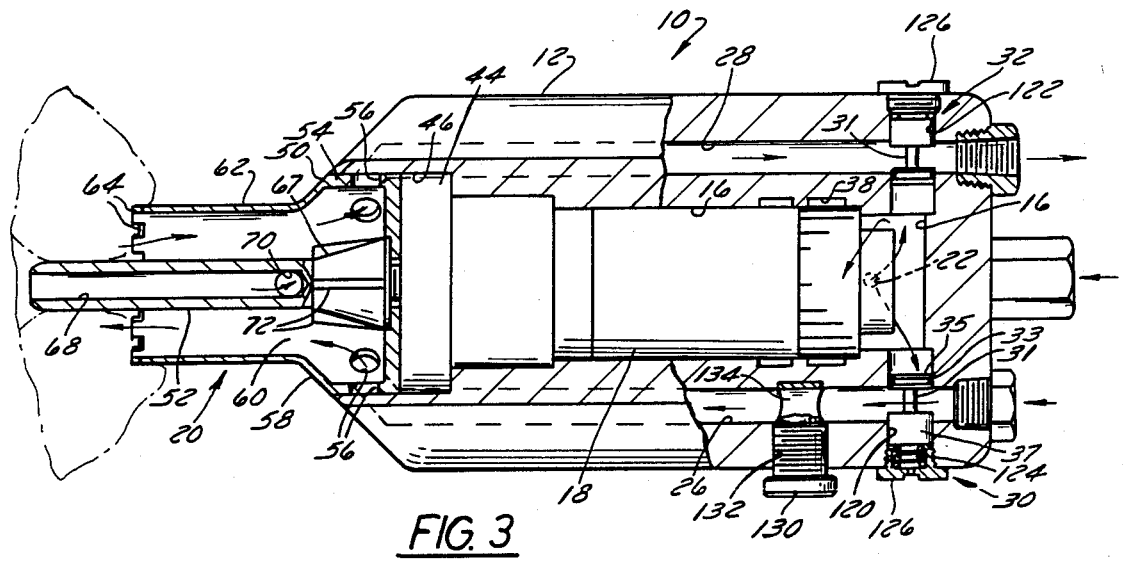
FIG. 3 is a top view similar to FIG. 2 showing the vent cutter in the operative mode.
Figure 5:
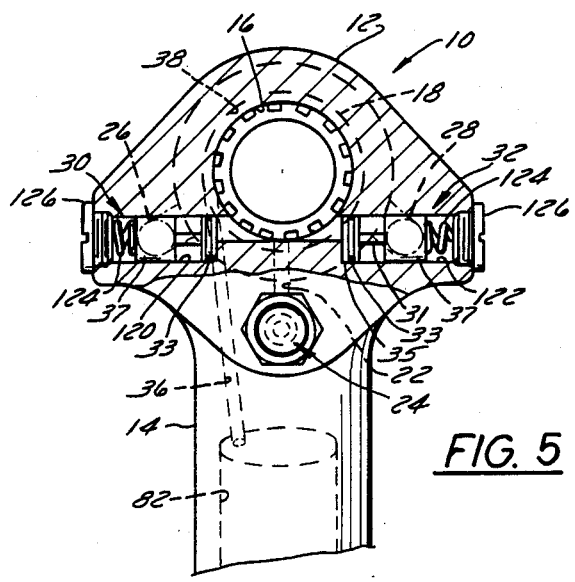
FIG. 5 is a rear view of the cutter showing the water and the vacuum passages.

The trigger assembly 24, FIG. 4, includes a cylindrical housing 84 having a central passage 86 and a counter bore 88 at one end. A number of annular grooves 90 are provided in the outer surface of the housing 84 to form lands 92, 94 and 96. The passage 86 is connected to the air flow passage 22 by means of a cross passage 98. The housing 84 is sealed in the passage 80 by means of "O" rings 100 positioned in annular grooves 93 and 95 provided in lands 92 and 94, respectively.

Air flow through the passage 86 is controlled by means of a trigger pin 102 having an enlarged head 104 which is positioned in the counter bore 88. The trigger pin 102 is sealed in the passage 86 by means of an O-ring 106 on one side of passage 98 and an O-ring 108 positioned in a groove 109 in the end of the pin 102 on the other side of passage 98. The pin 102 is biased to a closed position by the air pressure in line 22 acting on the end of the pin 102 to seat the end of the pin 102 in the outer end of passage 86.

The passage 86 is opened by means of a trigger 112 mounted for pivotal movement on the housing by means of a pin 114. The trigger 112 is operated by the operator grasping the handle 14 with the index finger positioned in the arcuate surface 116 provided in the trigger 112. On opening the valve, air admitted into the passage 86 will pass through the cross passage 98 and the passage 22 into the bore 16. Air discharged from the motor 18 will flow through the passage 36 into the chamber 82 in the handle 14 for discharge to the atmosphere.

The water flow passage 26 and the suction passage 28 are opened on an increase in pressure in bore 16 by means of the valves 30 and 32. In this regard each of the valves 30, 32 is positioned in a passage 120 and 122, respectively, which pass through the corresponding passage 26 and 28 and terminate in the bore 16. Each of the valves 30, 32 includes an annular groove 31 in the center to form a flange 35 and a head 37 at each end of the valve. The flange 35 is sealed in the passage by an O-ring 33. The valves are biased by means of springs 124 which are positioned in the passages 120 and 122 and retained therein by means of caps 126. When the trigger actuated assembly is opened to allow air under pressure to flow into the bore 16 the increase in pressure will initially act on the flange 35 of the valves 30 and 32 forcing them outward against the bias of springs 124. The outward movement of the valves will move the annular groove 31 in the valves 30 and 32 into the corresponding passages 26 and 28 allowing water to pass through the passage 26 and air to be drawn out of the passage 28. It should be noted that the springs 124 are of minimum spring rate so that the valves will open fully before the motor 16 starts to operate.

Means may be provided to control the flow rate of water passing through the passage 26. Such means is in the form of a threaded turn screw 130 which is positioned in a threaded passage 132 in the housing with the end of the screw projecting into the passage 26. A hole 134 is provided in the end of screw 130 having the same diameter as passage 26. By turning the screw 130 one quarter turn in the passage 132 the flow of water through the passage 26 can be increased or decreased from zero flow to full flow as required.

In operation, the operator merely squeezes the trigger 112 to move the trigger pin 102 sufficiently to move "O" ring 108 away from the end of passage 86. Air will flow through passage 86 and passage 22 into bore 16. The air pressure in bore 16 will build up to initially open valves 30 and 32 and then start motor 18. With this arrangement, cleaning of the cutter blade housing 50 is simultaneous with the cutting operation. In this regard it should be noted that as the pilot pin 52 enters the rectal passage and the cutter blade 62 engages the rear of the animal, the areas between the pilot pin 52 and the inside of the cylinder blade 62 is blocked so that the full suction force of the vacuum in passage 28 will be applied to the passage 68 in the pilot pin 52 through opening 70. All waste material which accumulates in the pilot pin will be sucked into passage 28. When the cutter blade 62 is pulled out of the rear of the animal, the end of the rectal passage will be pulled out of the cutter blade so that the intestinal tract will be cut away from the carcass and can be removed from the carcass.

I claim:

1. A vent cutter comprising
a housing,
an air motor mounted in said housing,
a cylindrical cutter blade assembly having a circular cutting edge and a pilot pin axially aligned in said cutter blade assembly and projecting outward therefrom to guide said cutter blade assembly in operation, said cutter blade assembly being operatively connected to said air motor,
first passage means in said housing for directing water into said cutter blade assembly,
second passage means in said housing for drawing water and waste material out of said cutter blade assembly,
a trigger operated valve assembly mounted in said housing for directing air under pressure into said motor to rotate said cutter blade assembly, and
valve means mounted in said housing for opening said first and second passage in response to an increase in air pressure in said air motor whereby said cutter blade assembly will be cleaned, while operating, by the flow of water through said first passage into the cutter blade assembly and the discharge of water and waste material through said second passage.

2. The cutter according to claim 1 wherein said pilot pin includes a waste removal passage.

3. The cutter according to claim 2 wherein said cutter blade assembly includes a cylindrical cutter blade having a plurality of ports around the cutter blade which are aligned with the first passage and second passage.

4. The cutter according to claim 2 wherein said pilot pin includes a number of impact blades around the base of the pilot pin whereby waste material drawn into said cutter blade assembly will be broken up for discharge through said ports into said second passage.

5. The cutter according to claim 2 including means in said second passage for controlling the flow of water through said second passage.

6. A vent cutter comprising
a housing having a handle,
a bore in said housing,
an air motor positioned in said bore,
a cutter assembly mounted on said housing and being operatively connected to said air motor,
said cutter assembly including a cylindrical cutter blade and a pilot pin axially aligned in said cutter assembly and having a number of impact blocks for breaking up waste material drawn into said cutter assembly, an air passage in said handle connected to said bore, a trigger operated air valve mounted in said air passage for controlling the flow of air through said air passage to said bore, means in said housing for directing water into said cutter assembly, means in said housing for directing water and waste from said cutter assembly, and valve means in said housing operatively connected to said bore and being responsive to an increase in air pressure in said bore to open said directing means whereby water will flow into said cutter assembly and water and waste will be directed out of said cutter assembly whenever said air motor is operating.

7. The cutter according to claim 6 wherein said cutter blade includes a serrated cutting edge.

8. The cutter according to claim 7 including an air vent chamber in said handle, and an air vent passage connecting said bore in said housing to said chamber in said handle for discharge from the handle.

9. The cutter according to claim 8 including means in the air chamber for muffling the discharge air noise.

10. A vent cutter comprising a housing, an air motor mounted in said housing, a cylindrical cutter blade assembly having a circular cutting edge, operatively connected to said air motor, said cutter blade assembly including a cylindrical cutter blade having a plurality of ports around said cutter blade, first passage means in said housing for directing water through said ports into said cutter blade assembly, second passage means in said housing for drawing water and waste material through said ports out of said cutter blade assembly, a trigger operated valve assembly mounted in said housing for directing air under pressure into said motor to rotate said cutter assembly, and valve means mounted in said housing for opening said first and second passage in response to an increase in air pressure in said air motor whereby said cutter blade assembly will be cleaned, while operating, by the flow of water through said first passage into said cutter blade assembly and the discharge of water and waste material through said second passage.

* * * * *